United States Patent [19]

Kanoe et al.

[11] Patent Number: 4,904,752

[45] Date of Patent: Feb. 27, 1990

[54] LIQUID CRYSTAL COPOLYESTER HAVING BLOCKED MOLECULAR CHAIN TERMINAL

[75] Inventors: Toshio Kanoe, Fuji; Kenji Hijikata, Mishima, both of Japan

[73] Assignee: Polyplastics Co., Ltd., Osaka, Japan

[21] Appl. No.: 120,157

[22] Filed: Nov. 13, 1987

[30] Foreign Application Priority Data

Nov. 13, 1986 [JP] Japan .................................. 61-270537

[51] Int. Cl.[4] ........................ C09K 19/52; C08G 69/44
[52] U.S. Cl. .................................... 528/97; 252/299.01; 428/1; 528/176; 528/179; 528/190; 525/437
[58] Field of Search ................... 525/437; 252/299.01; 428/1; 528/190, 176, 179

[56] References Cited

U.S. PATENT DOCUMENTS

| | | | |
|---|---|---|---|
| 3,657,191 | 4/1972 | Titzmann et al. | 525/437 |
| 4,184,996 | 1/1980 | Calundann | 524/604 |
| 4,728,698 | 3/1988 | Isayev et al. | 264/108 |

FOREIGN PATENT DOCUMENTS 17559   5/1973   Japan .................................. 525/437

*Primary Examiner*—Theodore Morris
*Attorney, Agent, or Firm*—Birch, Stewart, Kolasch & Birch

[57] ABSTRACT

A liquid crystal copolyester having a blocked molecular chain terminal comprising a copolyester which exhibits anisotropy in a molten state and has a functional group located at the terminal of its molecular chain and is blocked with a low-molecular compound having at least one aromatic ring and a molecular weight of 350 or less.

10 Claims, No Drawings

LIQUID CRYSTAL COPOLYESTER HAVING BLOCKED MOLECULAR CHAIN TERMINAL

BACKGROUND OF THE INVENTION

1. Field of the Invention

The present invention relates to a copolyester having high flowability and improved moisture and hydrolysis resistance comprising a copolyester which exhibits anisotropy in a molten state and has a functional group located at the terminal of its molecular chain and is blocked with a low-molecular compound having at least one aromatic ring.

2. Prior Art

In recent years, a liquid crystal polymer which exhibits anisotropy in a molten state has attracted attention as a resin having high strength, high heat resistance, and excellent chemical resistance as well as being characterized with excellent moldability and processability properties.

Various proposals have been made in connection with liquid crystal polymers. With respect to representative examples of such proposals, reference may be made to Japanese Patent Laid-Open Nos. 72393/1974, 43223/1975 and 50594/1979. In all of these liquid crystal polymers, a rigid monomer is incorporated into the skeleton thereof to develop liquid crystal properties, which characterizes a resin formed therefrom with a high strength and easy as is processable properties. As well known, a resin which exhibits anisotropy in a molten state has an extremely low viscosity because the melt viscosity depends on shear, which made it possible to utilize the resin per se as in the form of a thin film and fine parts or in the form of a composite material containing a filler and a reinforcing material incorporated therein for various heat-resistant and precision parts. In particular, the low viscosity of the polymer per se enables the incorporation of a filler and a reinforcing material in high proportions, which directs attention to the use of the resin for applications where an extremely high dimensional stability is required or in the field of magnetic materials in which the performance is proportional to the content of the filler.

In the above-mentioned resin, the molecular weight is usually reduced when a lower viscosity in a molten state is desired. Such an expedient somewhat spoils the mechanical strength, heat resistance, and chemical resistance of the resin. Particularly, since the bond units of the molecular chain comprise ester bonds, the resistance to hydrolysis greatly depends upon the molecular weight. Specifically, a reduction in molecular weight for the purpose of further reducing the viscosity of the polymer which exhibits anisotropy in a molten state, remarkably spoils the hydrolysis resistance and thus leads to the lowering in mechanical strength.

Although it is self-evident that the terminal of the molecular chain must be blocked in order to improve the hydrolysis resistance of a polyester, it is difficult to block the terminal and still not reducing the liquid crystal properties and lowering the heat resistance. This is because, not only is the development of the liquid crystal properties itself dependent on a delicate balance among various molecular skeletons, but also because the influence of the terminal blocking agent is likely to be more markedly exhibited than in the case of other polymers, due to the lowering in the molecular weight.

The present inventors have made extensive and intensive studies with a view toward realizing a resin having a combination of low viscosity with excellent hydrolysis resistance. As a result, the present inventors have found that the above-mentioned two properties which are contradictory to each other can be simultaneously realized by blocking the molecular chain terminal with a specific compound, which led to the completion of the present invention.

SUMMARY OF THE INVENTION

The present invention relates to a liquid crystal copolyester having high flowability and improved moisture resistance and hydrolysis resistance comprising a copolyester which exhibits anisotropy in a molten state and has a functional group located at the terminal of its molecular chain and is blocked with a low-molecular compound having at least one aromatic ring.

DETAILED DESCRIPTION OF THE INVENTION

In the present invention, the low-molecular compound used for blocking the molecular chain terminal is a compound having a molecular weight of 350 or less and at least one aromatic ring. A molecular weight which exceeds 350 would unfavorably lead to an increase in viscosity, which would have an adverse effect on the liquid crystal properties. When the skeleton is other than the aromatic ring, there would be a reduction in viscosity which would inhibit the terminal blocking reaction with respect to the main chain polymer. Further, it is required that the low-molecular compound have at least one reactive group capable of reacting with a functional group to be blocked which is located at the terminal of the polymer, i.e., a hydroxyl group, a carboxyl group and/or an amino group, to block the functional group. Examples of the reactive group include aldehyde, hydroxyl, carboxyl, amino, imino, glycidyl ether, glycidyl ester, allyl-substituted methyl, isocyanato, and acetoxy groups. Preferable reactive groups are hydroxyl, carboxyl, amino and esters thereof, and glycidyl groups.

The low-molecular compounds suitable for use in the present invention are those represented by the following formulae (A) to (I):

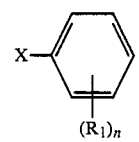

(A)

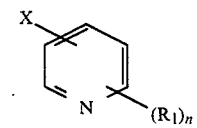

(B)

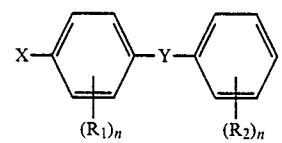

(C)

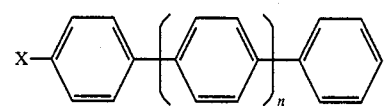

(D)

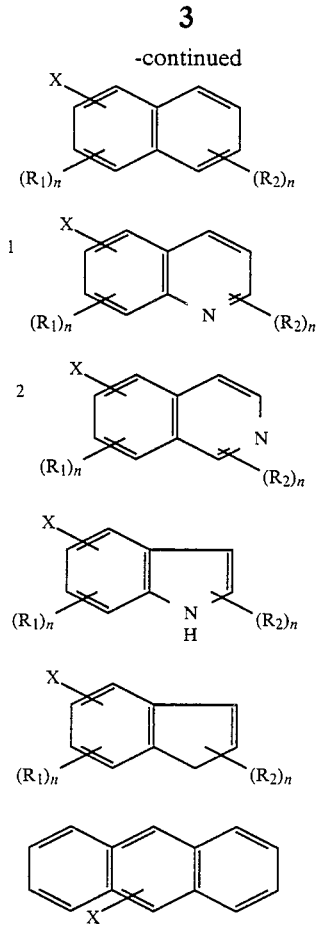

wherein

R₁ and R₂ are each a substituent selected from an alkyl having 1 to 10 carbon atoms, —Cl, —Br, —OCH₃, —CN, —NO₂, —NH₂, vinyl, ethynyl, acrylate, phenyl, benzyl, alkylurea, alkyl ester, and maleimino;

Y is a group selected from among alkylene having 1 to 4 carbon atoms, alkylidene, —O—, —S—, —SO—, —SO₂—, and —CO—;

n is an integer of 0 to 2; and

X is a functional group selected from aldehyde, hydroxyl, carboxyl, amino, imino, glycidyl ether, glycidyl ester, methyl, isocyanato, acetoxy, carboxyalkyl ester (wherein the alkyl has 1 to 4 carbon atoms), and carboxyphenyl ester.

Preferable examples of the compounds represented by the formula (A) include p-propylphenyl, p-t-butylphenol, cresol, xylenol, p-maleiminophenol, chlorophenol, and compounds obtained by acetoxylation thereof, p-chlorobenzoic acid, p-methylbenzoic acid, and their methyl esters thereof, and phenyl glycidyl ether.

Preferable examples of the compounds represented by the formula (B) include hydroxypyridine, 2-methyl-2-hydroxypyridine, and compounds obtained by acetoxylating them, nicotinic acid, 2-methynicotinic acid, and methyl esters thereof.

Preferable examples of the compounds represented by the formula (C) include 2-phenyl-2'-p-hydroxyphenylpropane, 2-phenyl-2'-p-acetoxyphenylpropane, p-isocyanylphenyl, p-phenylurenylphenylmethane, and bis-4,4'-diisocyanylphenylmethane.

Preferable examples of the compounds represented by the formula (D) include p-phenylphenol, p-acetoxyphenylbenzene, p-phenylbenzoic acid, and methyl p-phenylbenzoate.

Preferable examples of the compounds represented by the formula (E) include α- and β-naphthol, α-methyl-β-naphthol, α- and β-acetoxynaphthalene, α-methyl-β-acetoxynaphthalene, α- and β-naphthoic acid, and methyl α- and β-naphthoate.

Preferable examples of the compounds represented by the formula (F) ① include 8-hydroxyquinoline, 2-hydroxyquinoline, 8-acetoxyquinoline, 2-acetoxyquinoline, 2-carboxyguinoline, and a methyl ester thereof, phenyl ester, etc.

Preferable examples of the compounds represented by the formula (F) ② include 3-carboxyisoquinoline, 1,2,3,4-tetrahydroisoquinoline-3-carboxylic acid, and methyl esters thereof, phenyl ester, etc.

Preferable examples of the compounds represented by the formula (G) include 4-hydroxyindole, 5-hydroxyindole, 5-hydroxyindoline, 4-acetoxyindole, 5-acetoxyindole, and 5-hydroxyindole.

Preferable examples of the compounds represented by the formula (H) include 7-hydroxyindene, 5-hydroxyindene, 1-indanol, 5-indanol, 7-acetoxyindanol, 5-acetoxyindene, 1-aminoindane, and 2-aminoindane.

Preferable examples of the compounds represented by the formula (I) include anthranol, anthracene-9-carboxylic acid, and 9-acetoxyanthracene.

The resin having a molecular chain terminal to be blocked according to the present invention is a thermoplastic, melt-processable polymer composition which is optically anisotropic in a molten state and generally belongs to a thermotropic liquid crystal polymer.

The polymer which forms such an anisotropic melt phase has properties such that the molecular chains are regularly arranged parallel to each other in a molten state. The state in which molecules are arranged in this way is often called a liquid crystal state or a nematic phase of a liquid crystal material. Such polymer molecules are generally comprised of polymers which are slender and falt and have considerably high rigidity along the major axis of the molecules and a plurality of chain-extending bonds which are usually in either a coaxial relationship or a parallel relationship with each other.

The properties of the anisotropic melt phase may be examined by a customary polarimetric method using crossed polarizers. More particularly, the anisotropic melt phase can be examined by observing a molten sample placed on a Leitz hot stage in a nitrogen atmosphere at a magnification of 40 under a Leitz polarization microscope. The above-mentioned polymer is optically anisotropic. Namely, when it is placed between crossed polarizers, it permits transmission of a light beam. If the sample is optically anisotropic, the polarized light will be transmitted, even when it is in a static state.

It is preferred that the liquid crystal copolyester which exhibits anisotropy in a molten state and has a terminal to be blocked be comprised mainly of an aromatic polyester or an aromatic polyester-amide. Further, the liquid crystal copolyester may contain an polyester or a polyester-amide having other skeletons which does not exhibit anisotropy in a molten state in itself in the same molecular chain in such an amount as will not spoil the anisotropy in a molten state. The polyester having other skeletons which does not exhibit anisotropy in itself and is contained in part of the same molecular chain is preferably a polyalkylene terephthalate in which the alkylene has 4 or less carbon atoms, and polyethylene terephthalate and polybutylene terephthalate are suitable.

The copolyester which exhibits anisotropy in a molten state may be comprised of various compounds. However, it is preferred that the copolyester be comprised of an essential component which is at least one compound selected from ① naphtahalene compounds, ② phenyl compounds, ③ 4,4'-biphenyl compounds, and ④ compounds represented by the following general formula:

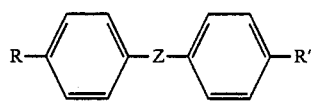

wherein Z is alkylene ($C_1 \sim C_4$), alkylidene ($C_1 \sim C_4$), —O—, —S—, —SO—, —SO$_2$—, and —CO—, and R and R' are each a reactive group such as hydroxyl or carboxyl, or esters thereof.

Preferable examples of the compounds constituting the copolyester include naphthalene compounds such as 2,6-naphthalenedicarboxylic acid, 2,6-dihydroxynaphthalene, 1,4-dihydroxynaphthalene, 6-hydroxy-2-naphthoic acid, and their ester derivatives thereof; para-substituted benzene compounds such as p-hydroxybenzoic acid, terephthalic acid, hydroquinone, p-aminophenol, p-phenylenediamine, and their ester derivatives thereof; mata-substituted benzene compounds such as isophthalic acid and resorcinol; biphenyl compounds such as 4,4'-dihydroxybiphenyl, and 4,4'-dicarboxybiphenyl; and compounds represented by the above general formula wherein Z is propane, methane, sulfite, or the like.

Among the copolyesters comprised of the abovementioned components, a copolyester containing at least one member selected from among naphthalene compounds, biphenyl compounds, and para-substituted benzene compounds as essential component are more preferable. Particularly preferable para-substituted benzene compounds include p-hydroxybenzoic acid, methylhydroquinone, and 1-phenylethylhydroquinone.

Examples of a specific combination of components include:

(1) 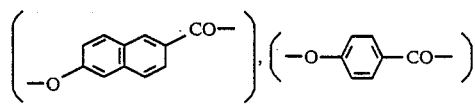

(2) 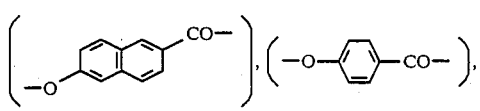
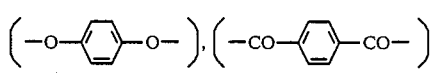

(3) 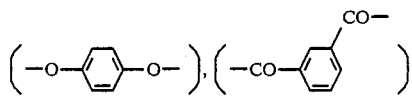

(4) 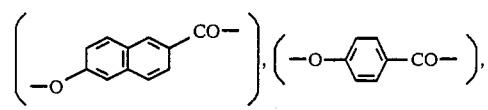

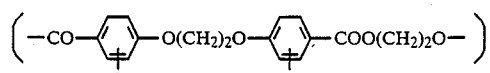

(5) 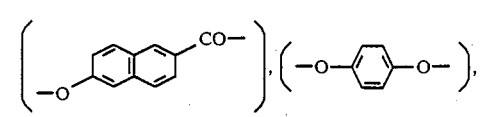

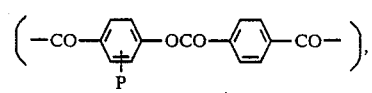

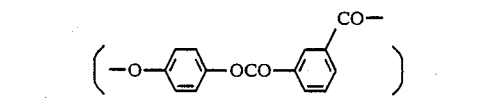

(6) 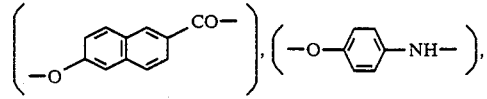

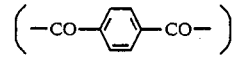

(7) 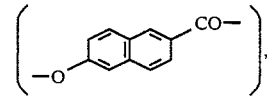

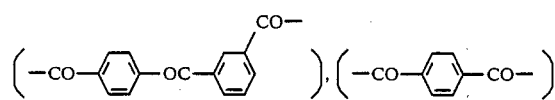

(8) 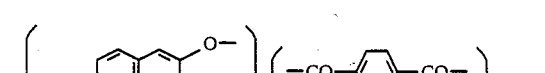

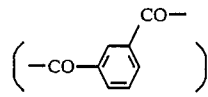

(9) 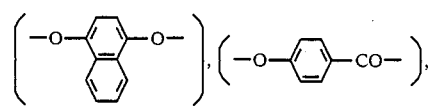

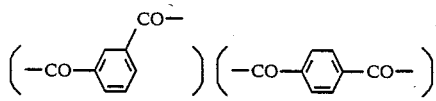

(10) 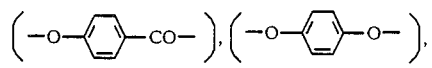
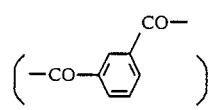
(11) 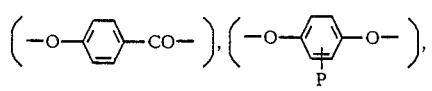
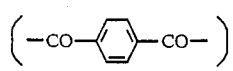
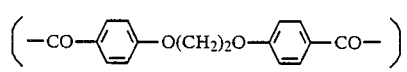
(12) 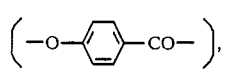
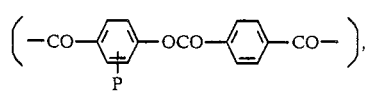
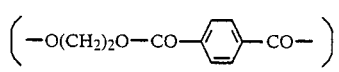
(13) 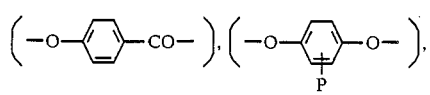
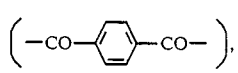
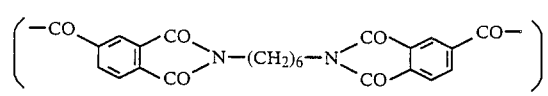
(14) 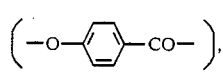
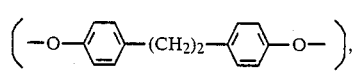
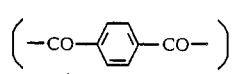
(15) 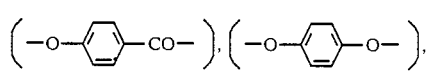
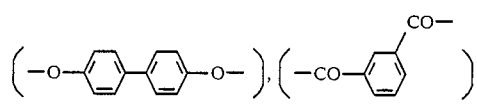
(16) 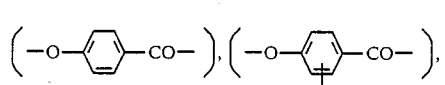
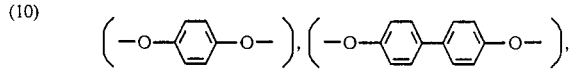
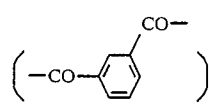
(17) 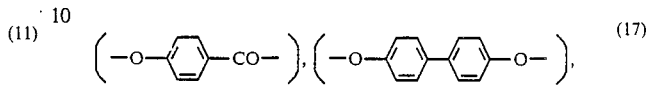
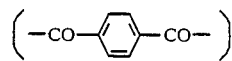
(18) 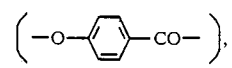
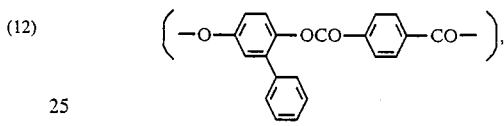
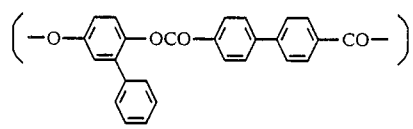
(19) 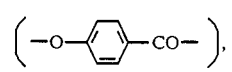
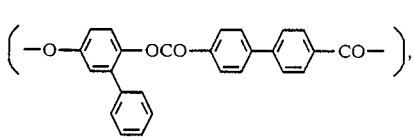
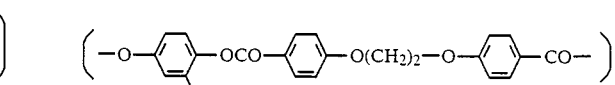
(20) 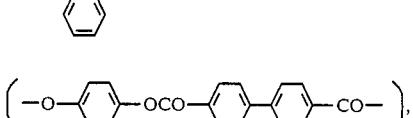
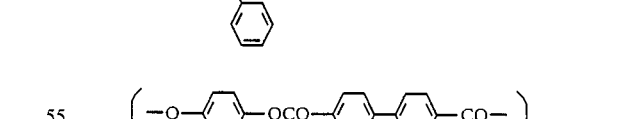
(21) 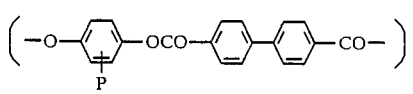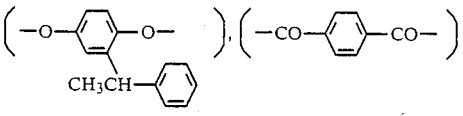
(22) 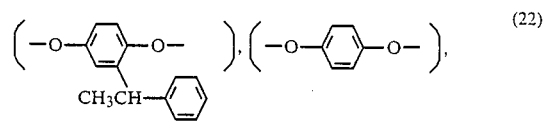

-continued

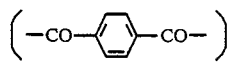

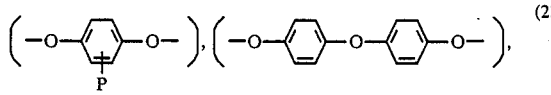
(23)

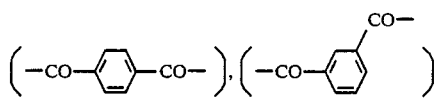
(24)

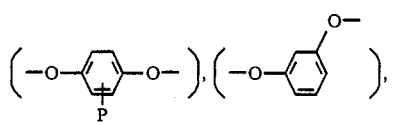

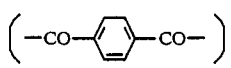

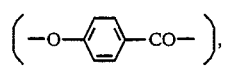
(25)

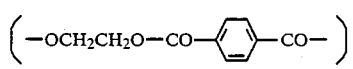

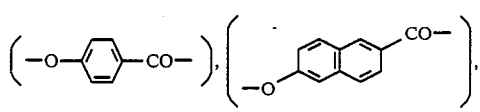
(26)

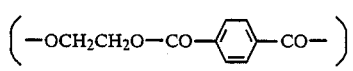

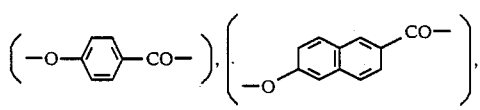
(27)

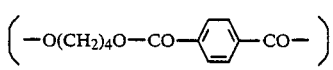

In the above formulae, P is a substituent selected from among —Cl, —Br, and —CH₃, Q is a substituent selected from among alkylene (C₁~C₄), alkylidene, —O—, —SO—, —SO₂—, —S—, and —CO—.

It is preferred that the molecular weight of the copolyester which exhibits anisotropy in a molten state be 30,000. A molecular weight exceeding 30,000 necessarily causes an increase in viscosity when molten, which inhibits the realization of high flowability. The flowability is increased with lowering in molecular weight. However, the molecular weight is preferably 1,000 or more from the standpoint of shape retention.

Although it is most preferred that the functional groups located at both of the molecular chain terminals be blocked, the blocking of only one molecular chain terminal is also acceptable. It is preferred that at least 25 percent of the terminal groups are blocked with the low molecular weight compounds. At least 45 percent is most preferable.

The reaction for blocking the terminal is conducted in a solution, a suspending medium, a molten state, or the like, which is usually employed in the polymerization reaction of polymers. However, a rigid polymer which exhibits anisotropy in a molten state as will be mentioned later is generally insoluble in an organic solvent. Therefore, it is preferred that the reaction be conducted in such a state that the resulting polymer is in a molten state. Further, in the reaction, a blocking agent compound may be added at any time of the initiation of the polymerization, during the polymerization and/or after the polymerization. In the reaction, it is also effective to use a usually employed ester forming catalyst which will be mentioned later.

The polyester and/or polyester-amide which exhibit anisotropy in a molten state and is useful for the present invention can be produced from various ester forming processes.

The monomer compounds can be reacted by a melt acidolysis method in the absence of any heat exchange fluid. According to this method, the monomers are first heated together to form a melt of reactants. As the reaction proceeds, solid polymer particles are suspended in the melt. Vacuum may be applied in order to facilitate the removal of volatile matter (e.g., acetic acid or water) which is produced as a by-product in the final stage of the condensation.

Further, a slurry condensation method may also be adopted in forming a wholly aromatic polyester suitable for use in the present invention. In this method, the solid product is obtained in such a state that it is suspended in a heat exchange medium.

In both the above-mentioned melt acidolysis process and slurry polymerization process, the organic monomer reactants from which the wholly aromatic polyester is derived may be used in the reaction in a modified form in which the hydroxyl groups of such monomers have been esterified at room temperature (i.e., in the form of a lower acyl ester). The lower acyl group preferably has 2 to 4 carbon atoms. It is preferred that acetates of the organic monomer reactants be used in the reaction. Further, the organic monomer reactants may also be used in a modified form in which the carboxylic acid group has been esterified (i.e., in the form of a phenol ester).

Representative examples of the catalyst which can be used if desired in both the melt acidolysis and slurry processes include dialkyltin oxides (e.g., dibutyltin oxide), diaryltin oxides, titanium dioxide, antimony trioxide, alkoxytitanium silicate, titanium alkoxide, alkali and alkaline earth metal salts of carboxylic acids (e.g., zinc acetate), Lewis acids (e.g., BF₃) and gaseous catalysts such as hydrogen halides (e.g., HCl). The amount of the catalyst is generally about 0.001 to 1% by weight, preferably about 0.01 to 0.2% by weight, based on the total weight of the monomers.

The aromatic polymers produced in the present invention tend to be substantially insoluble in the usual solvents, which render them to unsuitable for use in solution processing. However, these polymers may be readily processed by ordinary melt processing. The aromatic polymers produced in the present invention are somewhat soluble in pentafluorophenol.

The polymers produced in the present invention exhibit an inherent viscosity (I.V.) of at least about 0.3 dl/g, e.g., about 0.3 to 10.0 dl/g, as determined at 60° C. in the form of a solution prepared by dissolving the polymer in pentafluorophenol to have a polymer concentration of 0.1% by weight.

In order to improve various mechanical characteristics, the resin composition of the present invention may be blended with various additives and/or fillers by the methods known to those skilled in the art.

Examples of these additives include materials which are added to general thermoplastic resins and thermosetting resins, i.e., plasticizers, stabilizers such as antioxidants and ultraviolet absorbers, antistatic agents, flame retardants, coloring materials such as dyes and pigments, foaming agents, crosslinking agents such as divinyl compounds, peroxides and vulcanizing agents, and lubricants for improving the flowability and releasability.

Examples of the fillers include general inorganic fibers such as glass fiber, carbon fiber, metallic fiber, ceramic fiber, boron fiber, and asbestos; and powdery or sheet inorganic fillers such as calcium carbonate, highly dispersible silicic acid, alumina, aluminum hydroxide, talc powder, mica, glass flake, glass beads, quartz sand, silica sand, various powdery metals, carbon black, barium sulfate, plaster of Paris, silicon carbide, alumina, boron nitrite, and silicon nitride; and whisker and metallic whisker. [Effect of the Invention]

The polymers produced in the present invention is markedly excellent in flowability in a molten state and resistance to hydrolysis and, therefore, can be usefully employed in various applications in the fields of electric and electronic components. The polymers are particularly suitable for use in packaging agents of electronic components and printed circuit boards in which high flowability and moisture resistance are required. Further, when the use is intended in such an application as sealing agents of integrated circuit parts which require remarkably excellent dimensional stability, moisture resistance, and high flowability, the best suited material can be provided by forming a composite material in combination with a suitable filler such as molten silica.

EXAMPLES

The present invention will now be described in more detail with reference to the following examples that should not be construed as limiting the scope of the present invention.

Resins A to C used in the following examples were previously prepared by polymerization as follows.

resin A

A reactor equipped with a stirrer, a nitrogen inlet tube, and a discharge tube was charged with 68 parts by weight of isophthalic acid, 3944 parts by weight of terephthalic acid, 720 parts by weight of p-acetoxybenzoic acid, 216 parts by weight of 4,4-diacetoxybiphenyl, and 439.2 parts by weight of 2,6-diacetoxynaphthalene. The mixture was heated at 260° C. under a nitrogen stream. The heated mixture was vigorously stirred at 260° C. for 3 hr and then at 280° C. for 3 hr while formed acetic acid was distilled off from the reactor. The temperature was further raised to 300° C., and the feed of nitrogen was stopped. Then, the inside of the reactor was gradually evacuated so that the pressure was reduced to 0.1 mmHg 15 min after the initiation of evacuation. The contents of the reactor were stirred at this temperature and pressure for 1 hr.

The resulting polymer had an inherent viscosity of 0.82 as determined at 60° C. in the form of a pentafluorophenol solution containing 0.1% by weight of the polymer. In the observation under a polarization microscope, the polymer exhibited a pattern of a nematic liquid crystal in a molten state on a hot stage.

resin B

A reactor equipped with a stirrer, a nitrogen inlet tube, and a discharge tube was charged with 768 parts by weight of polyethylene terephthalate having an inherent viscosity of 0.62 and 1080 parts by weight of p-acetoxybenzoic acid. The mixture was heated at 250° C. under a nitrogen stream. The mixture was further heated so that the temperature reached 275° C. after 1 hr, and then vigorously stirred for 2 hr. The feed of nitrogen was stopped. Then, the inside of the reactor was gradually evacuated so that the pressure was reduced to 0.2 mmHg 30 min after the initiation of evacuation, and the contents of the reactor were further stirred for 6 hr.

The resulting polymer exhibited anisotropy in a molten state on a hot stage in the observation under a polarization microscope and had an inherent viscosity of 0.74 as determined in pentafluorophenol.

resin C

A reactor equipped with a stirrer, a nitrogen inlet tube, and a discharge tube was charged with 1188 parts by weight of p-acetoxybenzoic acid, 690 parts by weight of 2-acetoxy-6-naphthoic acid, and 54.4 parts by weight of terephthalic acid. The mixture was heated at 260° C. under a nitrogen stream. The heated mixture was vigorously stirred at 260° C. for 3 hr and then at 280° C. for 3 hr while formed acetic acid was distilled off from the reactor. The temperature was further raised to 320° C., and the feed of nitrogen was stopped. Then, the inside of the reactor was gradually evacuated so that the pressure was reduced to 0.1 mmHg 15 min after the initiation of evacuation. The contents of the reactor were stirred at this temperature and pressure for 1 hr.

The resulting polymer exhibited anisotropy in a molten state on a hot stage in the observation under a polarization microscope and had an inherent viscosity of 0.82 as determined in pentafluorophenol.

The ease of hydrolysis was evaluated based on the data on the lowering in inherent viscosity accompanying the hydrolysis reaction and increase in electrical conductivity of an aqueous solution of the resulting hydrolysis product.

EXAMPLE 1

A reactor equipped with a stirrer, a nitrogen inlet tube, and a discharge tube was charged with 330 parts by weight of the above-mentioned resin A and 46 parts by weight of p-acetoxy-t-butylphenylene. The mixture was heated at 280° C. under a nitrogen stream. The heated mixture was vigorously stirred for 5 hr while formed acetic acid was distilled off from the reactor. The temperature was further raised to 300° C., and the feed of nitrogen was stopped. Then, the inside of the reactor was gradually evacuated so that the pressure was reduced to 0.1 mmHg 15 min after the initiation of evacuation. The contents of the reactor were stirred at this temperature and pressure for 1 hr. The resulting polymer was pulverized while cooling with liquid nitrogen to obtain powder. The powder was washed with a hot mixed solvent comprised of toluene and acetone. The powder was dried by removing the solvent and then applied to the following tests.

The percentage blocking of the terminal of the resulting polymer was 97% as determined from the amount of the recovered excessive terminal blocking agent, had an inherent viscosity of 0.83 and exhibited anisotropy in a molten state in the observation under a polarization microscope. Further, the melting point of the polymer was determined with a DSC, and the polymer exhibited a melting point Tm of 305° C. during elevation of temperature.

10 g of the polymer powder as prepared above and 100 ml of purified water were placed in a clean Soxhlet extractor and refluxed therein. 300 hr after the initiation of the reflux, the inherent viscosity of the sample was determined and found to be 0.81. The refluxed, extracted water was cooled to room temperature respectively 72 hr and 300 hr after the initiation of the reflux and applied to the determination of electrical conductivity with a conductivity meter manufactured by Toa Denpa. As a result, it was found that the electrical conductivity was 48 μS/cm and 121 μS/cm.

EXAMPLE 2

104 parts by weight of a monofunctional isocyanate compound obtained by reacting 250 parts by weight of methylenediphenylene diisocyanate with 99 parts by weight of cyclohexanol, and 500 parts by weight of the resin B were placed in a reactor in the same manner as in Example 1. The mixture was heated at 265° C. under a nitrogen stream and was vigorously stirred for 6 hr while stirring with the reactor hermetically sealed, thereby causing a reaction. In the same manner as in Example 1, the resulting polymer was pulverized, washed and applied to the tests. The polymer had an inherent viscosity of 0.78 and exhibited anisotropy in a molten state. Further, the inherent viscosity 300 hr after the initiation of the extraction was 0.72. The electrical conductivities 72 hr and 300 hr after the initiation of the extraction were 69 μS/cm and 167 μS/cm, respectively.

EXAMPLES 3 to 15

Various terminal blocking agents were used, and the resulting polymers were applied to the same test. The results are shown in Table 1.

COMPARATIVE EXAMPLES 1 to 4

The same test as in Examples 1 and 2 was conducted without using any terminal blocking agent according to the formulations as shown in Table 1. The results are shown in Table 1.

COMPARATIVE EXAMPLE 5

An attempt to block the terminal of the resin A was made using a compound represented by the following formula:

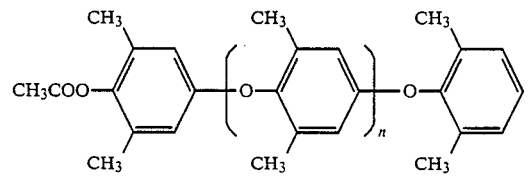

wherein n is 4.1. However, the percentage blocking of the terminal was as low as 3% or less. The observation of the resulting blocked polymer under a polarization microscope afforded a dark field in a molten state, and the polymer exhibited no liquid crystal properties.

TABLE 1

| Examples and comparative examples | Resin | Terminal blocking agent | Percentage blocking of terminal (%) | Tm (°C.) | Inherent Viscosity Before test (a) | Inherent Viscosity After 300 hr (b) | Percentage lowering $\left(\frac{a-b}{a} \times 100\right)$ | Electrical conductivity (μS/cm) After 78 hr | Electrical conductivity (μS/cm) After 300 hr |
|---|---|---|---|---|---|---|---|---|---|
| Ex. 1 | A | CH₃COO—C₆H₄—C(CH₃)₃ | 97 | 305 | 0.83 | 0.81 | 2.4% | 48 | 121 |
| Comp. Ex. 1 | A | — | — | 305 | 0.82 | 0.64 | 21.9 | 77 | 320 |
| Ex. 2 | B | OCN—C₆H₄—CH₂—C₆H₄—NHCOO—C₆H₁₁ | >75 | 222 | 0.78 | 0.72 | 7.6 | 69 | 167 |
| Comp. Ex. 2 | B | — | — | 220 | 0.74 | 0.62 | 16.2 | 86 | 273 |
| Ex. 3 | C | CH₃COO—C₆H₄—C(CH₃)₃ | 95 | 282 | 0.84 | 0.80 | 5.0 | 36 | 102 |
| Comp. Ex. 3 | C | — | — | 280 | 0.82 | 0.66 | 19.5 | 65 | 242 |
| Ex. 4 | A | CH₃COO—C₆H₄—N(CO—CH=CH—CO) (maleimide) | 83 | 310 | 0.83 | 0.82 | 1.2 | 57 | 147 |
| Ex. 5 | A | Cl—C₆H₄—CH₃COO | 89 | 306 | 0.81 | 0.78 | 3.7 | 55 | 144 |
| Ex. 6 | A | CH₃COO—pyridyl | 96 | 308 | 0.83 | 0.79 | 4.8 | 53 | 152 |
| Ex. 7 | A | CH₃COO—C₆H₄—C(CH₃)₂—C₆H₅ | 85 | 305 | 0.83 | 0.80 | 3.6 | 41 | 122 |

TABLE 1-continued

| Examples and comparative examples | Resin | Terminal blocking agent | Percentage blocking of terminal (%) | Tm (°C.) | Inherent Viscosity Before test (a) | Inherent Viscosity After 300 hr (b) | Percentage lowering $\left(\frac{a-b}{a}\times 100\right)$ | Electrical conductivity (μS/cm) After 78 hr | Electrical conductivity (μS/cm) After 300 hr |
|---|---|---|---|---|---|---|---|---|---|
| Ex. 8 | A | CH₃COO–C₆H₄–C₆H₅ (biphenyl acetate) | 86 | 307 | 0.82 | 0.80 | 2.4 | 41 | 120 |
| Ex. 9 | A | CH₃COO–naphthyl | 98 | 304 | 0.82 | 0.80 | 2.4 | 40 | 130 |
| Ex. 10 | A | CH₃COO–quinolinyl | 91 | 306 | 0.83 | 0.79 | 4.8 | 50 | 131 |
| Ex. 11 | A | CH₃COO–indolyl (NH) | 87 | 307 | 0.84 | 0.78 | 7.1 | 60 | 141 |
| Ex. 12 | A | CH₃COO–indanyl | 93 | 305 | 0.83 | 0.81 | 2.4 | 42 | 123 |
| Ex. 13 | A | CH₃COO–anthracenyl | 82 | 304 | 0.81 | 0.79 | 3.7 | 44 | 125 |
| Ex. 14 | A | CH₃COO–C₆H₄–C(CH₃)₃ | 50 | 305 | 0.83 | 0.76 | 8.4 | 62 | 190 |

TABLE 1-continued
| Examples and comparative examples | Resin | Terminal blocking agent | Percentage blocking of terminal (%) | Tm (°C.) | Inherent Viscosity Before test (a) | Inherent Viscosity After 300 hr (b) | Percentage lowering $\left(\frac{a-b}{a} \times 100\right)$ | Electrical conductivity (μS/cm) After 78 hr | Electrical conductivity (μS/cm) After 300 hr |
|---|---|---|---|---|---|---|---|---|---|
| Ex. 15 | A | 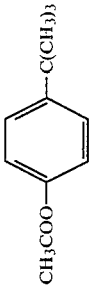 | 25 | 305 | 0.83 | 0.70 | 15.7 | 74 | 280 |
| Comp. Ex. 4 | A | 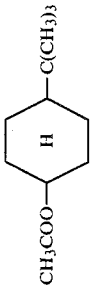 | 81 | 295 | 0.83 | 0.74 | 10.8 | 67 | 248 |

What is claimed is:

1. A liquid crystal copolyester having a blocked molecular chain terminal, comprising a copolyester which exhibits anisotropy in a molten state and has a functional group located at the terminal of the molecular chain thereof and is blocked with a low-molecular compound having at least one aromatic ring and a molecular weight of 350 or less, wherein said low-molecular compound used for blocking said molecular chain terminal is at least one member selected from the compounds represented by following formulae (A) to (I):

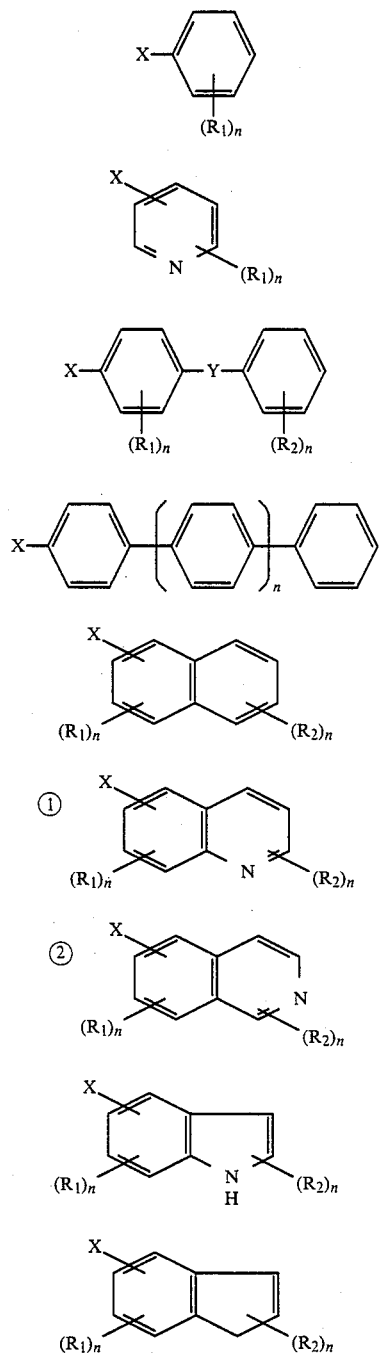

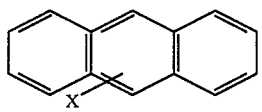

wherein
$R_1$ and $R_2$ are each a substituent selected from alkyl having 1 to 10 carbon atoms, —Cl, —Br, —OCH$_3$, —CN, —NO$_2$, —NH$_2$, vinyl, ethynyl, acrylate, phenyl, benzyl, alkylurea, alkyl ester, and maleimino;
Y is a group selected from alkylene having 1 to 4 carbon atoms, alkylidene, —O—, —S—, —SO—, —SO$_2$—, and —CO—;
n is an integer of 1 to 2; and
x is a functional group selected from aldehyde, hydroxyl, carboxyl, amino, imino, glycidyl ether, glycidyl ester, methyl, isocyanato, acetoxy, carboxyalkyl ester (wherein the alkyl has 1 to 4 carbon atoms) and carboxyphenyl ester.

2. A liquid crystal copolyester according to claim 1, wherein the functional group X of said low-molecular compound used for blocking said molecular chain terminal is a reactive group selected from among hydroxyl, carboxyl, amino and esters thereof, and glycidyl.

3. A liquid crystal copolyester according to claim 1 or 2, wherein said copolyester which exhibits anisotropy in a molten state contains in part of the molecular chain thereof an aromatic polyester or an aromatic polyesteramide which does not exhibit anisotropy, or a mixture thereof.

4. A liquid crystal copolyester according to claim 3, wherein said aromatic polyester which does not exhibit anisotropy is a polyalkylene terephthalate.

5. A liquid crystal copolyester according to claim 4, wherein the alkylene of said polyalkylene terephthalate has 4 or less carbon atoms.

6. A liquid crystal copolyester according to claim 1, wherein said copolyester which exhibits anisotropy in a molten state is comprised of at least one component selected from ① naphthalene compounds, ② phenyl compounds, ③ 4,4'-biphenyl compounds, and ④ compounds represented by the following general formula:

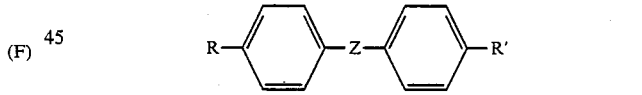

wherein Z is alkylene (C$_1$ ~ C$_4$), alkylidene (C$_1$ ~ C$_4$), —O—, —S—, —SO—, —SO$_2$—, and —CO—, and R and R' are each a reactive group selected from hydroxyl, carboxyl or esters thereof.

7. A liquid crystal copolyester according to claim 6, wherein said component is at least one compound selected from 2,6-dicarboxynaphthalene, 2,6-dihydroxynaphthalene, 2-hydroxy-6-naphthoic acid, and esters thereof.

8. A liquid crystal copolyester according to claim 6, wherein said component is at least one compound selected from p-hydroxybenzoic acid, terephthalic acid, hydroquinone, p-aminophenol, and substituted derivatives thereof and ester compounds thereof.

9. A liquid crystal copolyester according to claim 6, wherein said component is at least one compound selected from 4,4'-dihydroxybiphenyl, 4,4'-dicarboxybiphenyl, 4-hydroxy-4'-carboxy-biphenyl, and esters thereof.

10. A liquid crystal copolyester according to claim 1, wherein said copolyester which exhibits anisotropy in a molten state has a molecular weight of 30,000 or less.

* * * * *